United States Patent Office 3,304,18
Patented Feb. 14, 196

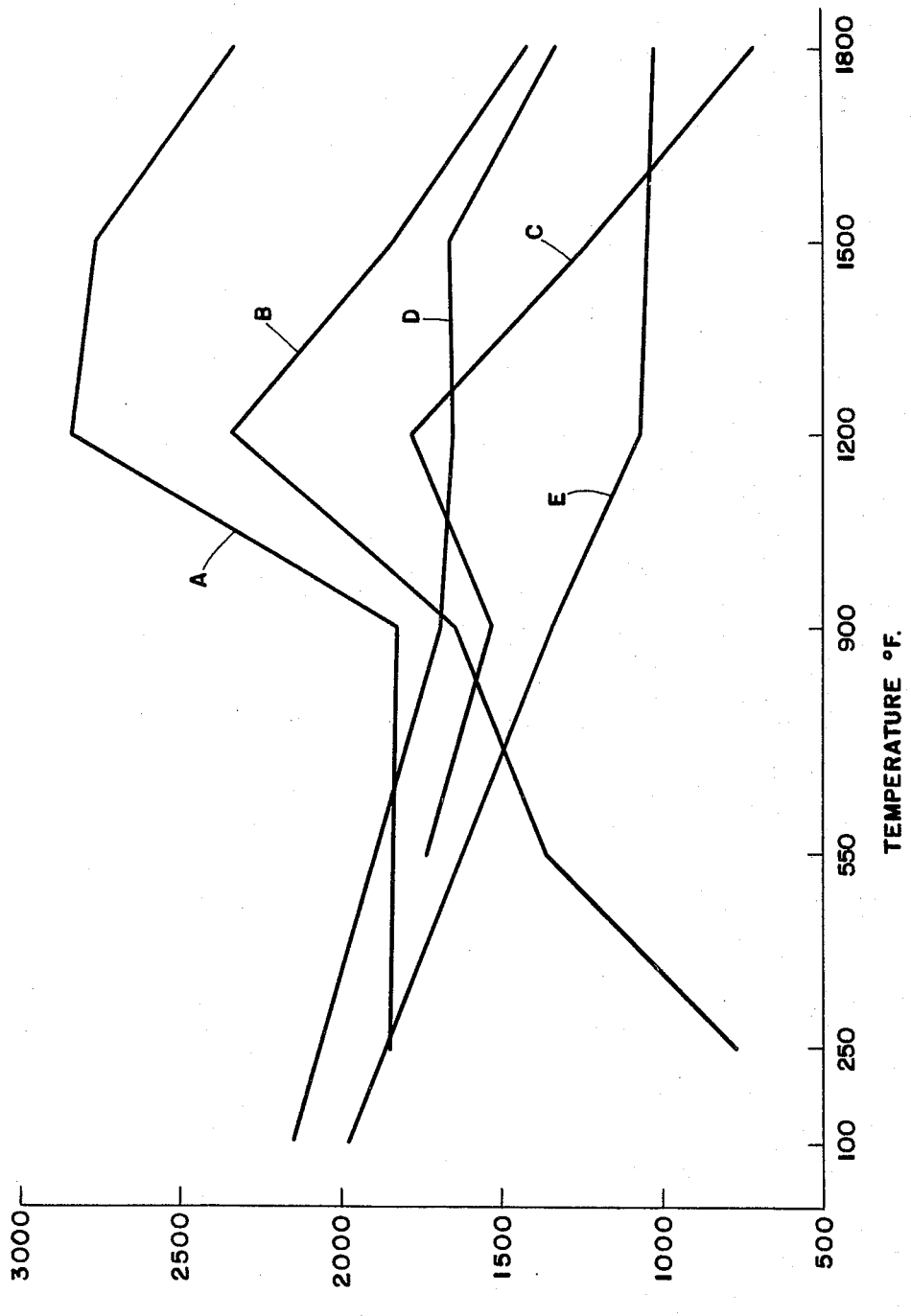

3,304,186
CARBON-BEARING REFRACTORIES
Robert W. Limes, Cleveland, and Robert O. Russell, Rocky River, Ohio, assignors to Republic Steel Corporation, Cleveland, Ohio, a corporation of New Jersey
Filed Mar. 1, 1965, Ser. No. 435,863
21 Claims. (Cl. 106—58)

This invention relates to a high-melting pitch-refractory mix made from magnesia or magnesite. More specifically, it relates to refractory walls and brick made from this composition. This invention also relates to the method of making such compositions.

With regard to good service life for refractories for basic oxygen furnaces, brick compositions which have carbon present have given better service life than those which have no carbon therein. Such linings are subjected to considerable mechanical abuses and stresses. For example, during charging the impact of the scrap causes considerable mechanical shock. Moreover, when the vessel is tilted for tapping, the side walls become an arch with all the mechanical stresses common to this type of structure. Therefore, mechanical strength is a requirement for any refractory used in such furnaces.

The carbon is usually added to the refractory as a coal tar pitch or tar. Pitch bonding is the most common method of manufacture since it is a relatively cheap process with modest capital investment. In this process, the pitch is added as molten pitch to the refractory composition. However, this method has several disadvantages, principally in low bonding strength on coking and poor physical properties caused by remelting of the pitch component during service.

This hot process requires individual heating of the various refractory components and the pitch before mixing. The resultant mixture is pressed into brick, baked, and then cooled, or where a ramming mixture is desired, the pressing step is omitted and the resultant mix is bagged for shipment. It is evident that the hot process requires extreme care in each step under circumstrances where it is not easy to maintain critical temperatures and times. Moreover, dealing with hot materials is more difficult than dealing with materials at room temperatures.

In an alternate method the burned brick is impregnated with molten pitch. Impregnation of the brick in this manner produces a better quality product with both ceramic and carbon bonding, but the cost is greatly increased since the process includes a firing step and a batch type impregnation operation involving a preheating of the brick and the pitch to obtain the required fluidity for forcing the molten pitch into the pores of the brick.

In pitch-bonded refractories, strength is dependent on the amount of pitch used and its coking characteristics. A high percentage of retained carbon after coking is a desirable characteristic. However, too much pitch present in the composition may cause slumping and increase the amount of volatiles which must escape during the burning-in of the lining.

U.S. Patent 3,044,889 suggests a cold process for using a tar which is liquid at room temperature, thereby avoiding the disadvantages of heating the refractory mix and the tar or pitch. In the suggested process, the disadvantages of the hot process are avoided by using the liquid tar. Morever, at least 1% phosphorus pentoxide is added to the refractory-tar mix. While the $P_2O_5$ is recommended by the patentee for use in either the cold process or in the hot process as described in mixes 5 and 6 in column 5, the patentee definitely recommends the use of the cold process for the various advantages recited therein. After the brick is pressed from the resultant refractory-tar-$P_2O_5$ composition, the mix is pressed into brick, which is heated to 400–600° F. for at least 25 hours a then cooled to room temperature.

In accordance with the present invention, applica have found that an improved carbon-refractory brick c be prepared by the use of a refractory mix predominate of magnesia, 6–18 percent of finely divided high-melti pitch and 0.5–5 percent of sodium polyphosphate as ( scribed hereinafter, with the mixture being effected room temperature or normal plant ambient temperatu The desired lubricity or plasticity of the resultant mix supplied by the addition of water to the resultant dry n of refractory-pitch-Na polyphosphate. The amount water is not critical since it is subsequently driven ( in the drying operation. A sufficient amount is added ; cording to the desired lubricity, but not enough that it squeezed out by the pressing. Generally, 2.5–4% weight of the total mix is satisfactory for pressing.

The resultant refractory mix can be pressed into bri If it is to be applied by a ramming or gunning procedt the mixture is kept dry and the water is added just bef( use. On subsequent heating at a temperature of abt 220° F. to drive off the water, a carbon-bearing refract( of superior quality is obtained. The temperature a time of drying need be only sufficient to remove the wat Generally 220° F. for about 16 hours is sufficient.

According to the aforementioned patent, it is imp sible to use $P_2O_5$ in a refractory mix which contains wat This is evident from the statement at the bottom of c umn 5, lines 67–70, which points out that phosphoric a was unsatisfactory when substituted for the $P_2O_5$. Sir the presence of water in the refractory mix would stantly convert the $P_2O_5$ to phosphoric acid, this rules ( the possibility of supplying lubricity or plasticity to 1 refractory mix by the use of water. Consequently, w their $P_2O_5$ process, the patentees are restricted to the 1 of a liquid tar in the cold process or a molten pitch w accompanying preheating of the refractory mix as ( scribed in the hot process.

In the accompanying drawing values are plotted : Modulus of Rupture-vs.-Coking Temperature to show improvements in strength of the products of this inventi as compared to various products either produced acco ing to the patent or available commercially.

In the process of the present invention, it is possible use a cold process with the lubricity and plasticity st plied by the water in the mix, and the bonding with refractory as well as with the pitch coke being effected the sodium polyphosphate.

The pitch can be any high melting type of pitch, st as coal tar pitch melting at 300° F. or higher. Gener ly, the higher the melting point of the pitch, the higl will be the percentage of carbon retained in the refracto The lower limit on the melting point is determined ma ly by the difficulty of pulverizing low melting pitch However, pitches of 300° F. melting point or higher ; easily pulverized. Nevertheless where pitches with me ing points as low as 250° F. are available in powder fo: they also can be used in the practice of this invention.

The particle size of the powdered pitch is not critic It is necessary only that there be substantially uniform d tribution of the pitch throughout the refractory m Particle sizes of 65 mesh and 100 mesh have been fou satisfactory.

The sodium polyphosphate used in the process this invention is represented by the formula:

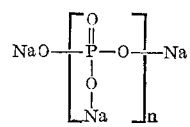

ntageous results have been obtained with such com-
ons in which *n* has a value as low as 4 and as
as 100. However, the preferred average value for
n the range of 10–30. Particularly suitable sodium
)hosphates of this type are available commercial-
der the trademarks "Gass H" and "Vitraphos."
is generally desirable to use the aggregate compo-
in at least two different grain sizes so that the re-
it mixture can be obtained in the maximum pack-
lensity. Sucr graded grain sizes of magnesia are
able commercially.
the present invention, both the pitch, or resultant
and the magnesia in the aggregate are reacted with
polyphosphate to produce the chemical bonding.
r components can be present in the aggregate, for
ple, those which cause mineralization of the mag-
, that is, densify and promote crystal growth and
by improve the reaction of the magnesia. Typical
ich other mineralizing components are dolomite,
chrome ore, alumina, zircon, zirconia, etc.
e polyphosphate bonding can be accomplished with
r lightly calcined or dead-burned magnesia, but for
ctory use, the aggregate is preferably dead-burned.
well known in the industry, dead burning is effect-
y calcining above about 2700° F. and light burn-
r light calcining is effected at about 1800–2000° F.
l burned magnesia is often referred to as periclase.
:rally the magnesia is dead-burned in admixture with
modifier that is to be used although in some cases
as with dolomite, the components are sometimes
ed separately.
ir example, the magnesia aggregate can be periclase,
ires of periclase and burned dolomite, mixtures of
lase and chrome ore, or magnesia aggregate pre-
l by adding dolomite, lime, chrome ore, alumina,
n, zirconia etc. to the magnesia prior to dead-burn- As previously stated, these additions promote
ralization of the periclase and enhance the bonding
t of the polyphosphate. Examples are a fused cast
containing 60% magnesia and 40% chrome ore,
agnesia grain containing 12% lime and 5% silica
e the latter are burned into the grain during dead-
ing, or a similar dead-burn periclase with zircon or
nia additions. With chrome ore and burned dolo-
as much as 50% or 60% can be used depending on
properties desired and the purpose of the product.
the other modifiers generally less than 30% is desir-
and in most cases much lower amounts achieve the
ed effect and are therefore more practical. How-
, regardless of the amount of such modifiers present,
polyphosphate bonding is essentially with the mag-
present even if there is as little as 5% magnesia in
aggregate. In the examples described below dead-
ed magnesia is used.
some cases it may be undesirable to use chrome ore
e aggregate since there is generally some iron oxide
nt in the chrome ore. Since the coke acts to reduce
iron oxide, this depletes the carbon somewhat with
sultant small loss in strength. However, since the
me ore has a desirable effect in slag attack, it is a
able component where the strength loss can be
ated.
le refractory compositions of this invention can be
in brick form, or as monolithic structures, or as
gs of walls, etc. The brick can be vibration cast,
ied or rammed according to well-known techniques.
olithic structures can be rammed or vibration cast,
linings are advantageously gunned. These composi-
are particularly suitable for use in basic oxygen
aces.
le invention is best illustrated by the following exam- These examples are intended merely by way of il-
ation and are not intended in any way to restrict the
e of the invention or the manner in which it can be
practiced. Throughout the examples and throughout the specification, unless specifically provided otherwise, parts and percentages are given as parts by weight and percentages by weight.

In the following examples, the total aggregate represents 100 parts and the various amounts of pitch and sodium polyphsophate represent the number of parts of each added to the 100 parts of aggregate. The magnesia is a commercial product of 60% coarse and 40% fine particle size to give the desired density.

In the coking rate test, a number of samples of 2″ x 2″ x 3″ dimensions are set in a container inside a furnace kept at 930° F. Successively different samples are crushed at 5 minute intervals and the crushing strength of each determined.

The coking test described herein is performed in a stainless steel box in which the temperature is raised to the coking temperature at a carefully controlled rate of 300° F. per hour, keeping the samples in a nitrogen atmosphere both during heating and cooling to eliminate carbon oxidation. The coking temperature is normally 1800° F. but other test temperatures are also used.

*Example I*

Four mixes are prepared from 98% magnesia, a commercial powdered pitch having a melting point of 350° F. and a commercial sodium polyphosphate as described above and available under the trademark "Glass H," using 100 parts of aggregate having particle size distribution as described above. After pressing into brick, the product is dried at 220° F. for sixteen hours and then cooled. The proportions and results are summarized in Table I. Experiments 1 and 2 show that high coke strength is not obtained when either the pitch or the polyphosphate is used alone.

TABLE I

|  | 1 | 2 | 3 | 4 |
|---|---|---|---|---|
| 98% Magnesia grain, parts | 100 | 100 | 100 | 100 |
| Powdered Pitch (m.p. 350° F.) (−100 mesh), parts | | 6 | 6 | 6 |
| Na Polyphosphate, n=21, parts | 4 | | 4 | *4 |
| Dry Modulus of Rupture (p.s.i.) | 1,795 | 740 | 1,885 | 1,740 |
| M of R coked at: | | | | |
| 1,200° F. (p.s.i.) | 1,555 | 1,570 | 2,995 | 3,040 |
| 1,800° F. (p.s.i.) | | 590 | 2,050 | 1,655 |
| Percent Weight loss on coking at: | | | | |
| 1,200° F | 0.7 | 1.5 | 2.0 | 2.1 |
| 1,800° F | | 1.8 | 2.4 | 2.5 |
| Percent Retained carbon after 1,800° F | | 4.5 | 3.9 | 3.8 |

*Different commercial brand of Na polyphosphate but of similar structure.

*Example II*

The procedure of Example I is repeated for three mixes using a salvage basic refractory of similar grain size instead of the 98% magnesia of Example I and increasing proportions of a higher melting pitch. The proportions and results are given below in Table II. This procedure is also repeated for five mixes using 98% magnesia and the results are shown in Table IIa.

TABLE II

|  | 1 | 2 | 3 |
|---|---|---|---|
| Salvage Corhart Grain, parts | 100 | 100 | 100 |
| Powdered Pitch (m.p. 350° F.) (−100 mesh), parts | 6 | 9 | 12 |
| Na Polyphosphate (n=21), parts | 4 | 4 | 4 |
| Dry Modulus of Rupture (p.s.i.) | 1,915 | 1,656 | 1,415 |
| M of R coked at 1200° F. (p.s.i.) | 1,735 | 1,950 | 1,745 |
| Percent weight loss on coking | 2.1 | 3.0 | 3.7 |

TABLE IIa

|  | 1 | 2 | 3 | 4 | 5 |
|---|---|---|---|---|---|
| 98% Magnesia grain, parts | 100 | 100 | 100 | 100 | 100 |
| Powdered Pitch (m.p. 350° F.) (−100 mesh), parts | 6 | 9 | 12 | 15 | 18 |
| Na Polyphosphate (n=21), parts | 4 | 4 | 4 | 4 | 4 |
| Dry Modulus of Rupture, (p.s.i.) | 1,800 | 1,500 | 1,305 | 1,260 | 1,125 |
| M of R coked at (p.s.i.): | | | | | |
| 1,200° F | 2,825 | 2,665 | 2,555 | 2,015 | 1,590 |
| 1,800° F | 2,310 | 2,085 | 1,760 | 1,300 | 845 |
| Percent wt. change coking at 1,800° F | 2.5 | 3.2 | 4.5 | 5.4 | 6.1 |
| Percent retained carbon | 3.8 | 5.4 | 6.5 | 7.2 | 8.6 |

*Example III*

The procedure of Example II is repeated for two mixes using the powdered pitch of Example I but in one of the mixes omitting the Na polyphosphate to show the different effect obtained. The proportions and results are shown below in Table III.

TABLE III

|  | 1 | 2 |
|---|---|---|
| Salvage Corhart Grain, parts | 100 | 100 |
| Powder Pitch (m.p. 300° F.) (−100 mesh), parts | 6 | 6 |
| Na Polyphosphate (n=21), parts | 4 | |
| Dry Modulus of Rupture (p.s.i.) | 1,570 | 615 |
| M or R coked at 1,200° F. (p.s.i.) | 2,600 | 1,005 |
| Percent weight loss on coking | 2.5 | 1.8 |
| Percent retained carbon | 4.1 | |

*Example IV*

A number of experiments are performed to compare the results obtained by the use of a tar which is liquid at room temperature as taught by the above-mentioned patent together with the $P_2O_5$ used therewith. A tar similar to that described in column 3, lines 41–43, of the patent is used in each case. A tar having highest possible carbon content is selected in order to give the test every advantage for retained carbon. In each instance, the test is performed with the same type of magnesia grain. To 100 parts of magnesia grain placed in a mixer is added 2 parts $P_2O_5$ and 5.5 parts of the liquid tar. After thorough mixing, bricks are pressed in 2″ x 2″ x 9″ dimensions at 7000 p.s.i. on a hydraulic press. The samples are placed in an oven in which the temperature is raised to 550° F. over a period of four hours and held at that temperature for 40 hours in accordance with the teaching at the top of column 4 of the patent.

In comparative tests with the product produced according to the process of this invention, a mixture of 6 parts powdered pitch (M.P. 350° F.), 4 parts Glass H (sodium polyphosphate having 21 repeating units), and 3.5 parts water and 100 parts of magnesia, is prepared and bricks of the same size as above are pressed at 700 p.s.i. in a hydraulic press. These are dried in an oven at 220–250° F. for 16 hours to remove the water.

The dried bricks, together with a number of commercial bricks used in basic oxygen furnaces are tested for various properties as shown in Table IV below. In the strength determinations, the samples are broken after the oven curing and also after coking at 900° F., 1200° F., 1500° F. and 1800° F. respectively. The coking test is performed in a sealed container raised to the test temperature at a rate of 300° F. per hour and held at the test temperature for a three hour period. The retained carbon test is determined on the 1800° F. coked sample by burning carbon and measuring the $CO_2$ produced. The coking rate is determined by placing six samples in a furnace kept at 930° F. and a different sample crushed at each 1 minute interval for a determination of the crushing strength. The weight loss is also determined on coking as an indication of the volatiles released. The HM sample is one of the better commercial materials presently used in basic oxygen furnaces and the 85 sample is one of an average type commercially available.

TABLE IV

|  | Exp. 1 | Exp. 2 | Exp. 3 | Exp. 4 | Exp. 5 | Exp. 6 |
|---|---|---|---|---|---|---|
|  | 6 Parts Powdered Pitch | 9 Parts Powdered Pitch | Liq. Tar No $P_2O_5$ | Liq. Tar 2 Parts $P_2O_5$ | Commercial HMC | Commercial 85 |
| Strength M of R: | | | | | | |
| After Curing | 1,800 | 1,500 | 1,725 | 1,365 | 2,145 | 1, |
| Coked at: | | | | | | |
| 900° F | 1,815 | | 1,520 | 1,640 | 1,690 | 1, |
| 1,200° F | 2,825 | 2,665 | 1,790 | 2,325 | 1,650 | 1, |
| 1,500° F | 2,765 | | 1,215 | 1,820 | 1,670 | 1, |
| 1,800° F | 2,310 | 2,085 | 705 | 1,410 | 1,335 | 1, |
| Retained Carbon, Percent, Coked at 1,800° F | 3.8 | 5.3 | 2.6 | 2.6 | 4.9 | |
| Coking Rate Test, Crushing Str. (930° F.), minutes: | | | | | | |
| 5 | +180 | | +180 | +180 | 73 | |
| 10 | +180 | | +180 | +180 | 20 | |
| 15 | +180 | | +180 | +180 | 20 | |
| 20 | +180 | | +180 | +180 | 11 | |
| 25 | +180 | | +180 | +180 | 12 | |
| 30 | +180 | | +180 | +180 | 23 | |
| Weight Loss, Percent: | | | | | | |
| Curing at 550° F | | | 1.2 | 1.2 | | |
| Coking at: | | | | | | |
| 900° F | 2.0 | | 0.6 | 1.0 | 2.4 | |
| 1,200° F | 2.2 | 2.9 | 0.9 | 1.2 | 2.6 | |
| 1,500° F | 2.3 | | 1.0 | 1.3 | 2.7 | |
| 1,800° F | 2.4 | 3.2 | 1.1 | 1.4 | 2.3 | |

As shown in Table IV, the commercial samples show typical loss of strength as the coking temperature is increased. In comparison, the products of Experiments 1 and 2 produced according to the process of the invention shows a marked improvement in all tests. The products produced according to Experiments 3 and 4 which use liquid tar show lower strength characteristics than those of Experiments 1 and 2, particularly at the higher coking temperatures. The two commercial samples of Experiments 5 and 6 show higher strength curing, but likewise have lower strengths than the
...cts produced in Experiments 1 and 2. These differ-
... in strength values are depicted in FIG. 1 which
...s the various values plotted for Modulus of Rup-
-vs.- Coking Temperature. Curve A represents the
...s for Experiment 1 wherein 6% powdered pitch is
... according to this invention. Curve C represents
...alues for Experiment 3 in which liquid tar is used
...ut $P_2O_5$. As shown in curve B, the addition of
... in Experiment 4 improves the strength in comparison
...e results of Experiment 3. However, the strength
...cteristics do not approach those obtained in Experi-
... 1 as shown in curve A. The two commerical
...les are represented by curves D and E which illus-
... that the strength after coking at higher temperatures
...much inferior to the products produced according
... is invention.
...ble IV also shows much higher values for retained
...n in Experiments 1 and 2 as compared to Experi-
...s 3 and 4 where liquid tar is used. Since there is
...it on the amount of liquid that can be used in a
...re since excess will run off or be squeezed out upon
...ing, the use of liquid tar has a decided disadvantage
...e a high value of retained carbon is desired.
... the coking rate test, the crushing strength at 930°
... superior in Experiments 1, 3 and 4 in comparison
... the commercial products. This test for Experiment
... not considered necessary since the greater amount
...tch in comparison with Experiment 1 indicates that
...uld give at least as good results as Experiment 1 in
...est. In the weight loss test at various coking tem-
...ures, superior results are obtained for the products
...xperiments 1 and 2 as compared to those obtained
...periments 3 and 4.

*Example VI*

...place of the magnesia aggregate used in the preced-
...xamples, a lime-bearing periclase is used having the
...wing composition:

| | Percent |
|---|---|
| | 82.2 |
| | 12.0 |
| | 5.0 |
| $_3$ | 0.6 |
| $_3$ | 0.2 |

...ith 100 parts of this aggregate there are used 4 parts
...odium polyphosphate sold commercially under the
...mark Glass H ($n=21$) and 6 parts of solid pitch
...cles having a melting point of 350° F. The Modulus
...upture of the product after being dried at 220° F. is
... p.s.i. and after coking at 1800° F. is 2340 p.s.i The
...ht loss on coking is 2.4% and the percent retained car-
... is 3.5%.
...pplicants have filed concurrently herewith another ap-
...tion covering a refractory composition consisting es-
...ally and solely of the magnesia aggregate and sodium
...itially and solely of the magnesia aggregate and so-
...phosphate in contrast to the composition of the pres-
... invention which also contains pitch. The result-
...product of the other invention is a polyphosphate or
...ical bonding of only the refractory aggregate and
... the chemically bonded aggregate *and pitch* as in the
...nt invention. Therefore, the carbon-bearing compo-
...n of this invention is entirely different from the poly-
...e or chemically bonded aggregate of the companion
...ication.
...hile certain features of this invention have been de-
...ed in detail with respect to various embodiments
...of, it will, of course, be apparent that other modifica-
... can be made within the spirit and scope of this in-
...ion, and it is not intended to limit the invention to
...xact details shown above insofar as they are defined
...e following claims.

The invention claimed is:
1. A refractory mixture consisting essentially of
   (a) granules of an aggregate containing at least 5%
       by weight of magnesia,
   (b) 6–18 parts by weight per 100 parts by weight of
       aggregate, of pulverized high-melting pitch,
   (c) a chemical bonding agent consisting essentially of
       0.5–6 parts by weight per 100 parts by weight of
       aggregate of a sodium polyphosphate of the formula

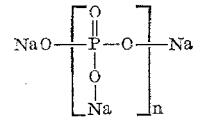

wherein $n$ is an integer having a value of at least 4
   and no more than 100, and
   (d) sufficient water to give the mix the desired degree
       of lubricity.
2. A refractory mixture of claim 1 in which said so-
dium polyphosphate is one in which the average value of
$n$ is about 10–30.
3. A refractory mixture of claim 2 in which said ag-
gregate is predominantly magnesia.
4. A refractory mixture of claim 2 in which said aggre-
gate is a fused cast grain containing approximately 60%
by weight of magnesia and approximately 40% by weight
of chrome ore.
5. A refractory mixture of claim 2 in which said pow-
dered pitch is one having a melting point of at least
300° F.
6. A refractory mixture of claim 2 in which said pow-
dered pitch has a melting point of about 350° F.
7. A refractory mixture of claim 1 in which said ag-
gregate is predominantly magnesia.
8. A refractory mixture of claim 1 in which said aggre-
gate is a fused cast grain containing about 60% by weight
of magnesia and about 40% by weight of chrome ore.
9. A refractory mixture of claim 1 in which said pow-
dered pitch is one having a melting point of at least
300° F.
10. A refractory mixture of claim 1 in which said pow-
dered pitch has a melting point of approximately 350° F.
11. A process of making a bonded refractory mixture
comprising the steps of mixing
   (a) granules of an aggregate containing at least 5%
       by weight of magnesia,
   (b) 6–18 parts by weight per 100 parts by weight of
       aggregate, of pulverized high melting pitch;
   (c) a chemical bonding agent consisting essentially of
       0.5–6 parts by weight per 100 parts by weight of ag-
       gregate of a sodium polyphosphate of the formula

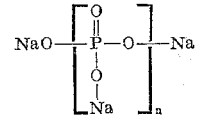

wherein $n$ is an integer having a value of at least 4
   and no more than 100; and
   (d) sufficient water to give the mix the desired degree
       of lubricity; shaping the mix in its desired ultimate
       form; and thereafter heating the mix to drive the wa-
       ter therefrom.
12. A process of claim 11 in which said shaped mix is
heated to a temperature of at least 220° F. for a time suffi-
cient to remove the water.
13. A process of claim 12 in which said sodium poly-
phosphate is one in which the average value of $n$ is about
10–30.
14. A process of claim 13 in which aggregate is pre-
dominantly magnesia.
15. A process of claim 13 in which said aggregate is a
fused cast grain containing approximately 60 percent by
weight of magnesia and approximately 40 percent by
weight of chrome ore.

16. A process of claim 13 in which said powdered pitch is one having a melting point of at least 300° F.

17. A process of claim 13 in which said powdered pitch has a melting point of about 350° F.

18. A process of claim 12 in which said aggregate is predominantly magnesia.

19. A process of claim 12 in which said aggregate is a fused cast grain contatining about 60 percent by weight of magnesia and about 40 percent by weight of chrome ore.

20. A process of claim 12 in which said powdered pitch is one having a melting point of at least 300° F.

21. A process of claim 12 in which said powered pit has a melting point of approximately 350° F.

References Cited by the Examiner
UNITED STATES PATENTS 3,193,402  6/1965  Rusoff et al. _____ 106—
3,199,995  8/1965  King et al. _____ 106—

HELEN M. McCARTHY, *Acting Primary Examiner.*

TOBIAS E. LEVOW, *Examiner.*

J. POER, *Assistant Examiner.*

UNITED STATES PATENT OFFICE
CERTIFICATE OF CORRECTION

Patent No. 3,304,186                                              February 14, 1967

Robert W. Limes et al.

It is hereby certified that error appears in the above numbered patent requiring correction and that the said Letters Patent should read as corrected below.

Column 3, line 6, for "Gass H" read -- Glass H --; line 10, for "Sucr" read -- Such --; column 7, line 59, strike out "essentially and solely of the magnesium aggregate and so".

Signed and sealed this 17th day of October 1967.

(SEAL)
Attest:

Edward M. Fletcher, Jr.                                      EDWARD J. BRENNER

Attesting Officer                                                       Commissioner of Patents